United States Patent
Dibb

(10) Patent No.: US 7,222,257 B1
(45) Date of Patent: May 22, 2007

(54) METHOD AND SYSTEM FOR REPAIRING A REDUNDANT ARRAY OF DISK DRIVES

(75) Inventor: James E. Dibb, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 933 days.

(21) Appl. No.: 09/879,554

(22) Filed: Jun. 12, 2001

(51) Int. Cl.
*G06F 11/00* (2006.01)

(52) U.S. Cl. .......................................... 714/6; 711/114

(58) Field of Classification Search ............... 714/6; 711/114
See application file for complete search history.

(56) References Cited

U.S. PATENT DOCUMENTS

| | | | | |
|---|---|---|---|---|
| 5,522,031 A | * | 5/1996 | Ellis et al. ..................... | 714/6 |
| 5,611,069 A | * | 3/1997 | Matoba ........................ | 711/114 |
| 5,790,773 A | * | 8/1998 | DeKoning et al. ............. | 714/6 |
| 6,070,249 A | * | 5/2000 | Lee ................................ | 714/6 |
| 6,154,853 A | * | 11/2000 | Kedem ........................... | 714/6 |

* cited by examiner

*Primary Examiner*—Gabriel L. Chu
(74) *Attorney, Agent, or Firm*—Bromberg & Sunstein LLP

(57) ABSTRACT

A method and system for repairing a redundant array of disk drives. A failed drive in a redundant array is reconstructed by reconstructing the failed drive to a mirrored subsystem formed by a temporary disk drive and the disk drive slot associated with the failed drive. The failed drive is replaced by a replacement drive and the mirrored subsystem copies data from the temporary disk drive to the replacement disk drive.

14 Claims, 7 Drawing Sheets

METHOD AND SYSTEM FOR REPAIRING A REDUNDANT ARRAY OF DISK DRIVES

FIELD OF THE INVENTION

The present invention relates to computer system data storage and, more particularly, to a method and system for repair of a failed disk drive in a redundant array of independent disks ("RAID") system.

BACKGROUND OF THE INVENTION

RAID technology can provide high availability to data, while allowing data integrity even though a disk drive may fail. When there is a failure, the data located on the failed drive must be re-created using data from the surviving drives. For example, one common RAID configuration, called RAID-5, includes several disk drives, where data is written in a "stripe" across the drives, consisting of corresponding data sectors on each drive, in which one of the data sectors stores parity data for the other data sectors in the stripe. These several disk drives form a redundancy group. If one of the drives suffers a failure rendering its portion of a stripe inaccessible, the lost data is reconstructed from the other drives via computation methods well known in the art, such as employing an exclusive-or operation among the data sectors on the other drives.

A second example of a redundancy group is a RAID-3 array. A RAID-3 array includes several disk drives, where the data in a data block is written in a stripe across the drives, consisting of corresponding data sectors on each drive. One of the drives stores parity data for the other sectors in the stripe and data is written in parallel to each drive. Data reconstruction if a drive fails is accomplished through a process similar to the process employed for a RAID-5 array.

In another RAID configuration, called "RAID-1," two disk drives form a redundancy group. Identical data is written to each disk drive, creating a subsystem with full data redundancy, through an operation called "mirroring." If one drive fails, the configuration continues to operate without interruption, using the other disk drive. The subsystem restores consistency of data as required between the two disk drives by copying data missing on one drive to the other drive.

In a further RAID configuration, called "RAID-0", data is written in a "stripe" across two or more disk drives, consisting of corresponding data sectors on each drive. Error correction data blocks are not created for the stripe in a RAID-0 configuration. While this configuration does not provide redundancy for the data, this configuration does provide for increased throughput as compared to storing the data on a single disk drive. A hybrid configuration, called "RAID-1/0" combines the striping of RAID-0 with the mirroring of RAID-1. A RAID 1/0 array forms a redundancy group including at least four disk drives, divided into mirrored pairs, as in a RAID-1 array. Data is then striped across the set of mirrored pairs, as in a RAID-0 array.

Other RAID configurations offer varying degrees of data redundancy and varying levels of performance for characteristics such as disk data transfer rate.

A conventional method for reconstruction of a failed disk drive in a redundancy group in a disk drive array is to provide a temporary disk drive for the failed disk drive and then to reconstruct the data, that was on the failed disk drive, to the temporary disk drive. During the reconstruction operation the remaining disk drives in the redundancy group are accessed and data that was on the failed drive is regenerated by applying an error correction operation (such as an exclusive-or on data blocks and a corresponding parity block or a copy operation in a RAID-1 array.) This reconstruction operation on the temporary disk drive proceeds to completion. Thereafter, data can be copied to a permanent replacement disk drive inserted into the physical location of the failed disk drive.

SUMMARY OF THE INVENTION

In accordance with an embodiment of the present invention, a method is provided for repairing a failed disk drive in a redundancy group of disk drives in an array of disk drives. A mirrored subsystem is created within the array including a temporary disk drive and the failed disk drive slot, and is substituted for the failed disk drive in the redundancy group, facilitating repair of the failed disk drive. Each data block of the failed disk drive is reconstructed. Each reconstructed data block is written to the mirrored subsystem. At some point a replacement disk drive is inserted into the failed disk drive slot. Data is copied from the temporary disk drive to the replacement disk drive. The mirrored subsystem may be replaced by the replacement disk drive anytime after the data thereon matches the data on the temporary disk drive. Repair of the failed disk drive is complete after both data reconstruction and insertion of the replacement disk drive are completed. In particular, the redundancy group may be a RAID-5 array, a RAID-3 array, a RAID-1 array or a RAID-1/0 array and the mirrored subsystem may be a RAID-1 array.

In accordance with a disk drive array system embodiment of the present invention, logic detects a failure of one of the disk drives in the redundancy group. The redundancy group is reconfigured to include the disk drives in the redundancy group that have not failed and a second storage array, the second storage array operating as a mirrored subsystem including a temporary disk drive and the disk drive slot associated with the failed disk drive. The data blocks on the failed drive are reconstructed to the mirrored subsystem. A replacement drive inserted into the disk drive slot associated with the failed disk drive becomes a component of the mirrored subsystem. When the replacement drive contains the same data as the temporary disk drive, the redundancy group may be restored to its initial configuration, the replacement disk drive having replaced the failed disk drive. In particular, the redundancy group may be a RAID-5 array, a RAID-3 array, a RAID-1 array or a RAID-1/0 array and the mirrored subsystem may be a RAID-1 array.

The use of a mirrored subsystem allows for contemporaneous reconstruction and copying, thereby, efficiently restoring the redundancy group to a fully operational configuration. Other objects and advantages of embodiments of the invention will become apparent to those of ordinary skill in the art upon review of the following description of specific embodiments of the invention taken in conjunction with the drawings.

BRIEF DESCRIPTION OF THE DRAWINGS

The invention will be more readily understood by reference to the following description, taken with the accompanying drawings, in which.

DETAILED DESCRIPTION OF SPECIFIC EMBODIMENTS

As used in this description and in any appended claims, the following terms will be understood to mean the following:

A "disk drive" is a physical unit for storing randomly accessible blocks of digital data. A disk drive may be implemented, without limitation, as a rotating drive where data is stored electromagnetically on disk platters, or a solid state memory, such as flash memory, or any other physical means of storing blocks of data that are randomly accessible.

A "slot" is a set of physical connections including power and signal lines that allows one disk drive to be connected to the electronic circuitry controlling an array of disk drives.

A "redundancy group" is an array including at least two disk drives such that the data on one disk drive may be reconstructed from the data on the remaining disk drive or disk drives in the group. Such redundancy groups include, without limitation, RAID-1 arrays, RAID-3 arrays, RAID-5 arrays, RAID-1/0 arrays and variations thereof, as are known in the art.

A "mirrored subsystem" is a disk drive array with slot connections for two disk drives. The subsystem includes logic such that data written to one disk drive is also written to the other disk drive, when the other disk drive is connected to its slot. The subsystem reads data from at least one disk drive and may read data from either of the two disk drives if both drives are connected to their respective slots. The subsystem restores consistency of data as required between the two disk drives by copying data missing on one drive to the other drive.

As used in this description and in any appended claims, disk drive arrays may be implemented in a variety of physical configurations including, without limitation, configurations in which an array controller and the disk drives in the array, may be located in a plurality of locations with communication among the elements of the array effected by any means known in the art.

Figure 1:
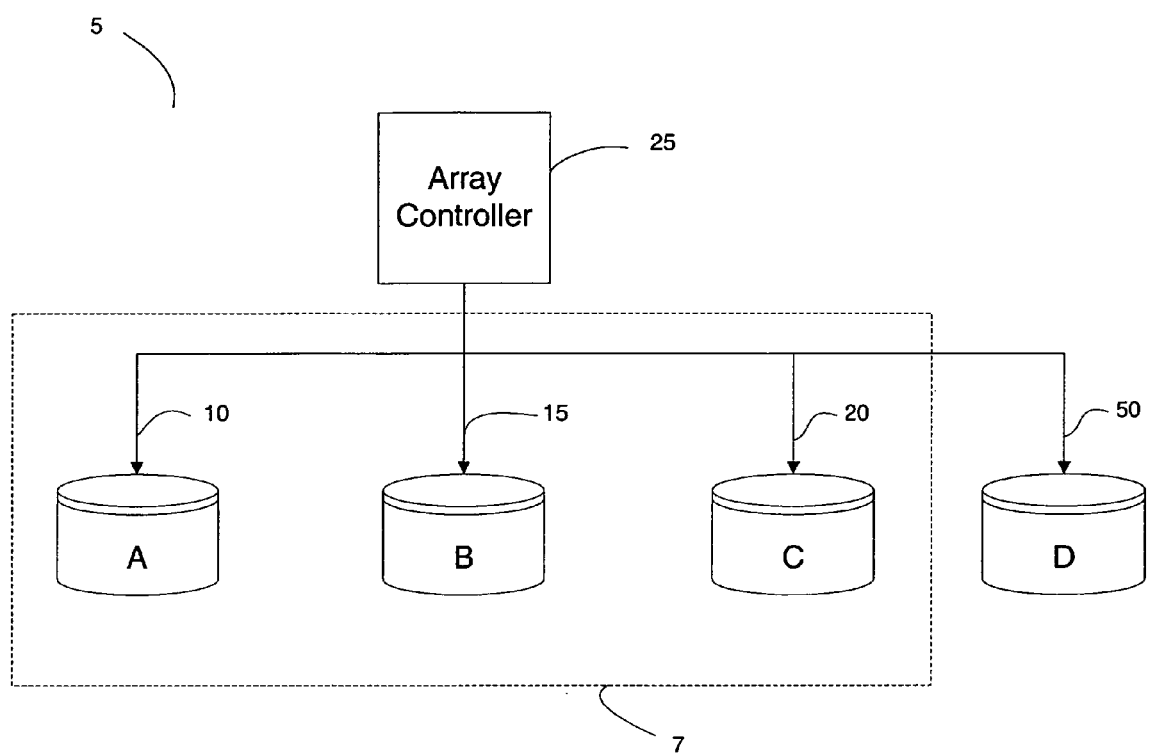
FIG. 1 shows a redundant disk drive array.

FIG. 1 is a block diagram showing an array 5 of four disk drives. Array 5, as shown, is implemented with a redundancy group 7 of three disks drives, A, B and C. The array could include additional disk drives, both within and without redundancy group 7. Data is stored in redundancy group 7 in stripes that contain a plurality of data blocks and at least one associated error-correction block. Disk drives A, B, and C are each connected to the array controller 25 via associated disk drive slots, respectively 10, 15 and 20. Drive D, which is outside redundancy group 7, is connected to array controller 25 via associated disk drive slot 50.

Figure 2:
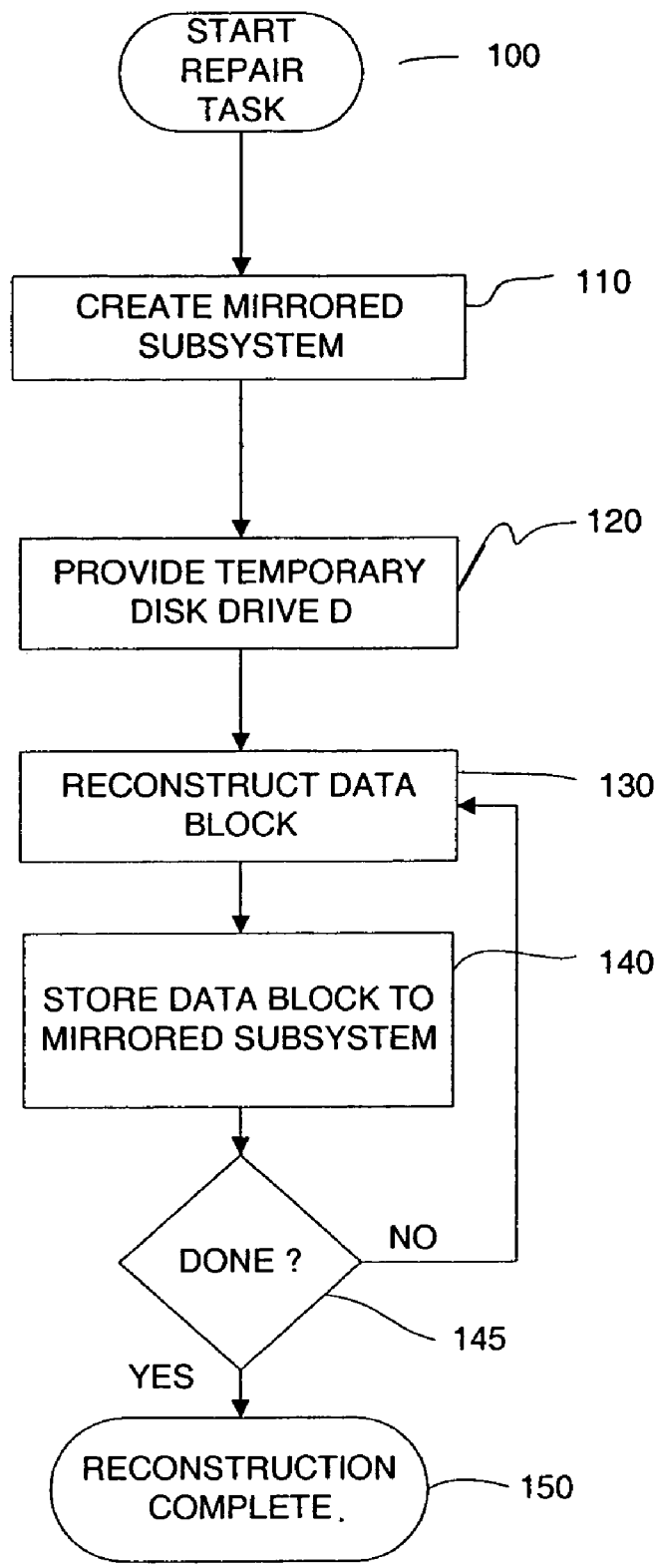
FIG. 2 is a flow chart showing a repair method according to an embodiment of the present invention.
Figure 3:
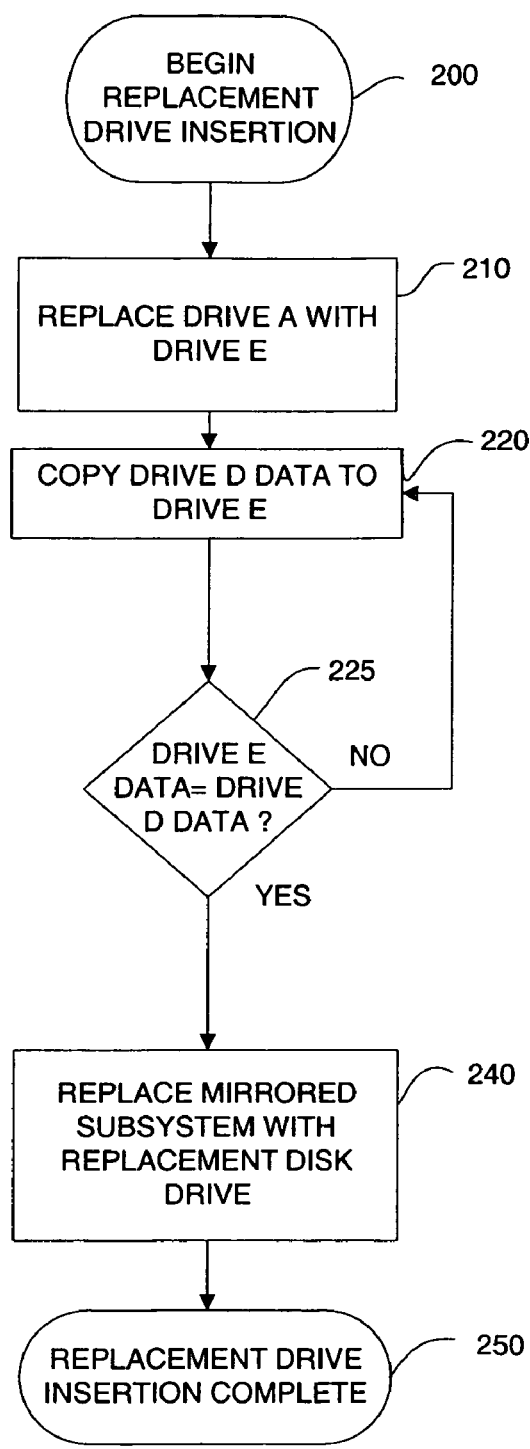
FIG. 3 is a flow chart showing further steps of the repair method.

FIG. 2 is a flow chart showing a method for repairing a failed disk drive in redundancy group 7, according to an embodiment of the present invention. As used in this description and in any appended claims, reconfiguration may be accomplished, without limitation, by physical connection changes or by rerouting electrical signals. Disk drive A is assumed to have failed, but the failed drive could be any of the disk drives in the redundancy group in the array.

Figure 4:
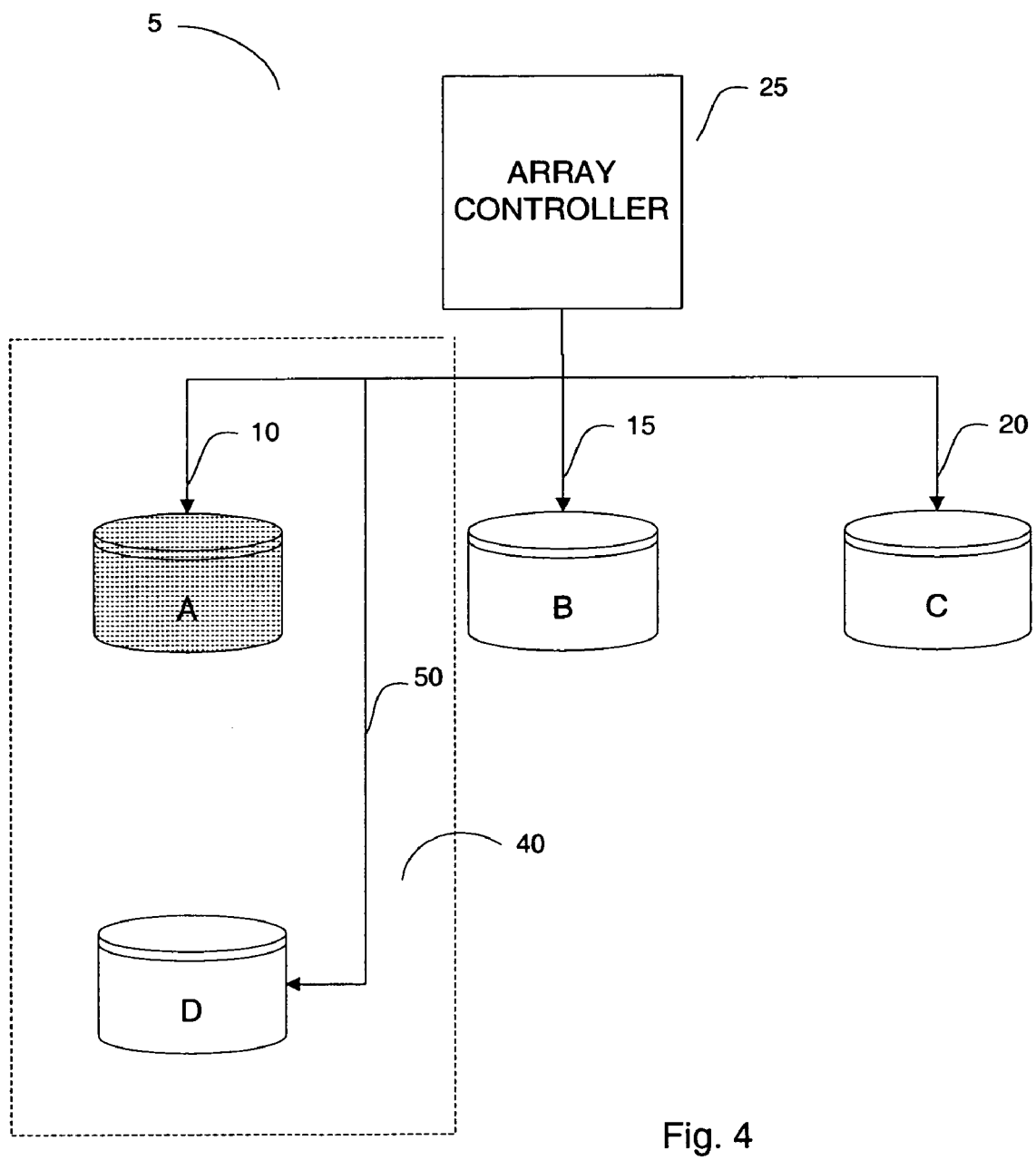
FIG. 4 shows an intermediate repair configuration for the redundant disk drive array.

Failure of a disk drive is detected, for example, by logic in the array controller 25. This initiates 100 a repair method. In accordance with the method, a mirrored subsystem 40 is created 110 by logic in array controller 25, changing the configuration of array 5 to the configuration shown in FIG. 4. Mirrored subsystem 40 comprises slots for two disk drives: the drive in slot 10 for failed disk drive A is mirrored with the disk drive connected to slot 50. Disk drive A is shown in gray to denote a failed disk drive. Temporary disk drive D is provided and connected 120 to slot 50. The configuration of redundancy group 7 is changed by logic in array controller 25 to drives B, C, and the mirrored subsystem 40. In accordance with a specific embodiment, the mirrored subsystem 40 is configured as a RAID-1 array.

Logic in array controller 25 reconstructs 130 each data block on failed drive A by accessing the data on remaining drives B and C. The reconstruction is accomplished by error correction procedures that are well known in the art, such as performing an exclusive-or operation on the remaining disk drives that have not failed, if the error correction technique used is parity, or by using another technique appropriate for the error correction technique employed in the redundancy group in the array. Logic in array controller 25 stores 140 each reconstructed data block to the mirrored subsystem 40. When slot 10 each contains failed drive A or slot 10 is empty, with no drive connected, the array controller 25 effectively writes the reconstructed data blocks only to temporary drive D. When slot 10 has an operational replacement disk-drive E, the array controller 25 writes the reconstructed data blocks to temporary drive D and to replacement disk drive E. Logic in array controller 25 checks 145 whether the reconstruction has been completed and continues reconstructing data blocks 130 until reconstruction is complete 150. The operations of storing data to the redundancy group in the array and providing data from the redundancy group in the array continue during the reconstruction.

Figure 5:
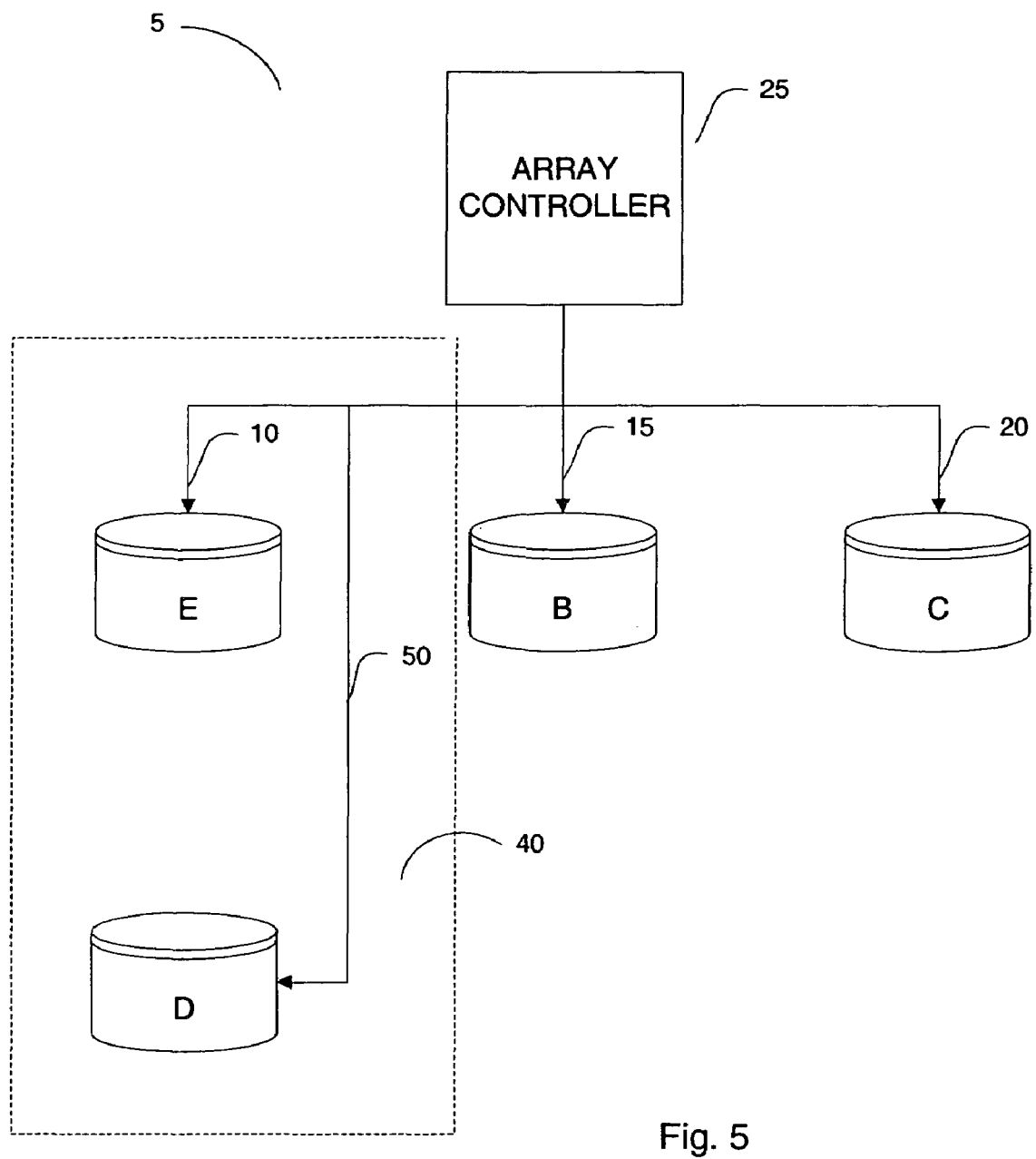
FIG. 5 shows a second intermediate repair configuration for the redundant disk drive array.
Figure 6:
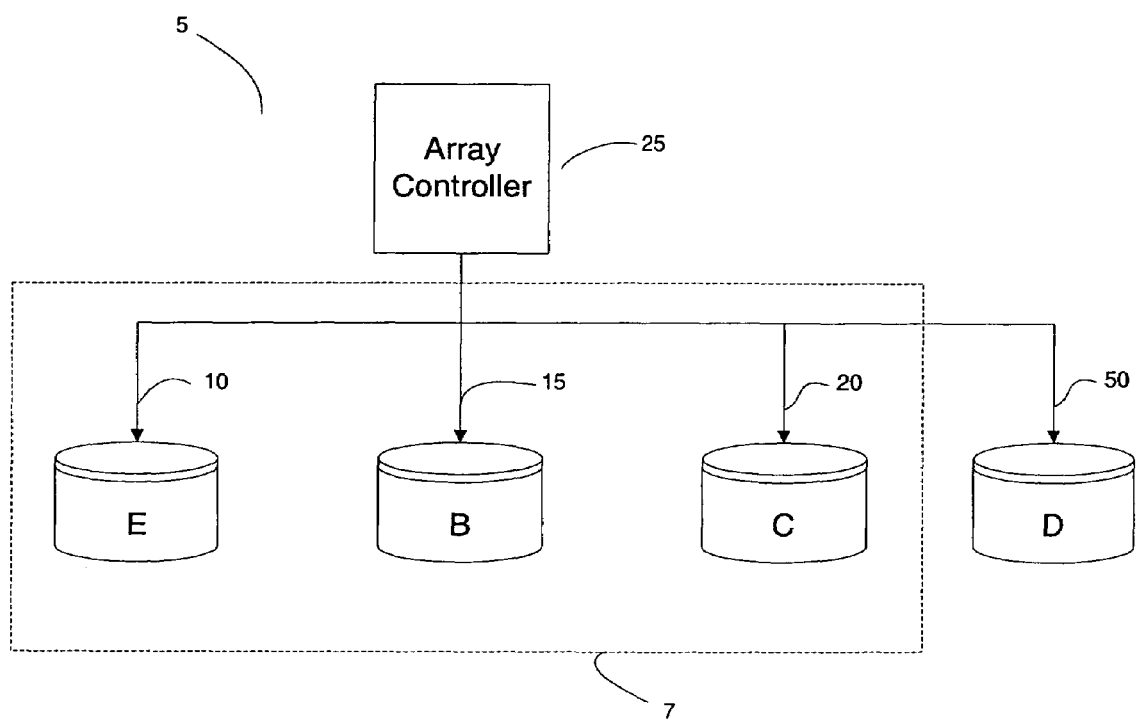
FIG. 6 shows the disk drive array after repair is completed.

When a replacement disk drive E is available, the replacement disk insertion task begins 200. This task can occur at any time after repair has begun. Replacement drive E is connected 210 to slot 10, as shown in FIG. 5, and subsequent reconstructed data blocks, if any, are written 140 contemporaneously to both drive D and to drive E, as a result of writes to mirrored subsystem 40. Logic in array controller 25 recognizes that replacement drive E has been connected to slot 10 and copies 220 to disk drive E, the data from disk drive D that has already been reconstructed to drive D. This copy operation 220 occurs contemporaneously with the continuing reconstruction operation. In accordance with a specific embodiment, the mirrored subsystem logic automatically causes the controller 25 to recognize the need to do a complete copy operation from the temporary disk drive to the replacement disk drive E in response to detecting insertion of the replacement disk drive E into slot 10. Such logic is found in a RAID-1 subsystem, for example. Referring back to FIG. 5, copying of data 220 is repeated 225 until the data on drive E is identical to the data on drive D. The mirrored subsystem may be replaced 240 by drive E at any time after the data on drive E is identical to the data on drive D, creating the configuration shown in FIG. 6. Replacement drive insertion is then complete 250.

Reconstruction of the data that was formerly on drive A continues (130, 140, and 145), until completed. After both reconstruction of the data and replacement drive insertion complete, array repair is complete.

Figure 7:
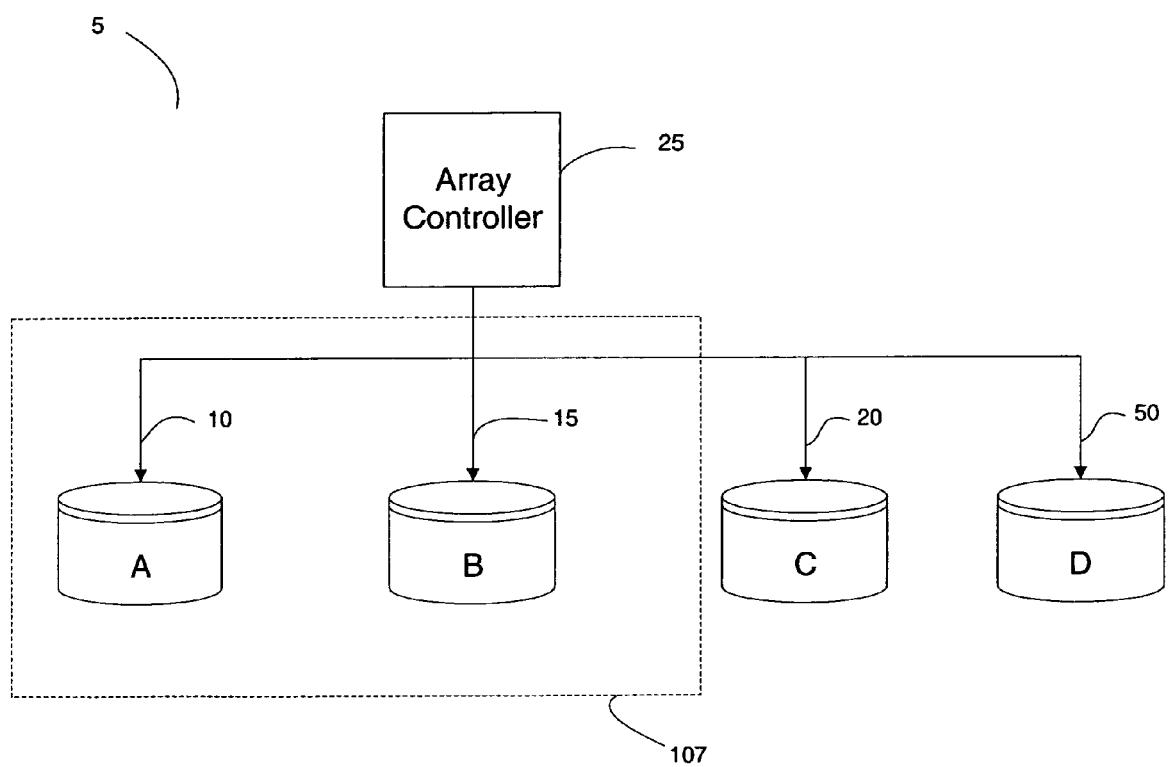
FIG. 7 shows a redundant disk drive array.

In another embodiment of the invention, a redundancy group 107 is a mirrored subsystem, including drives A and B, as shown in FIG. 7. The repair method for a failed disk drive A in group 107 is the same as described for failed drive A in the configuration of FIG. 1, with the exception that the logic in array controller 25 reconstructs 130 each data block on failed drive A by copying the data from remaining drive B to a mirrored subsystem. In particular, the redundancy group 107 may be a RAID-1 array or variations thereof, as are known in the art. The mirrored subsystem may also be a RAID-1 array made up of a temporary disk drive and the disk drive slot associated with disk drive A.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the disk repair logic is implemented as a set of computer program instructions that is converted into a computer executable form, stored as such in a computer readable medium, and executed by a microprocessor within the array under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

The present invention may be embodied in other specific forms without departing from the true scope of the invention. The described embodiments are to be considered in all respects only as illustrative and not restrictive.

What is claimed is:

1. A method for handling a failed disk drive in a redundancy group of disk drives in an array of disk drives, the failed disk drive located in a failed disk drive slot, comprising:
   creating a mirrored subsystem within the array, the subsystem including a temporary disk drive and the failed disk drive slot; and
   reconfiguring the redundancy group to consist of the disk drives of the redundancy group that have not failed and the mirrored subsystem, such that the mirrored subsystem is substituted for the failed disk drive in the redundancy group and the redundancy of the redundancy group is restored, when the failed disk drive contains redundancy data for the redundancy group.

2. A method as in claim 1, further comprising:
   inserting a replacement disk drive in the failed disk drive slot;
   copying data from the temporary disk drive to the replacement disk drive; and
   replacing the mirrored subsystem with the replacement disk drive after the data on the replacement disk drive matches the data on the temporary disk drive.

3. A method as in claim 2, wherein the redundancy group is a RAID-5 array.

4. A method as in claim 2, wherein the redundancy group a RAID-3 array.

5. A method as in claim 2, wherein the redundancy group is a RAID-1/0 array.

6. A method as in claim 2, wherein the redundancy group is a RAID-1 array.

7. A method as in claim 2, wherein the mirrored subsystem is a RAID-1 array.

8. A method as in claim 1, further comprising:
   reconstructing each data block of the failed disk drive; and
   writing each reconstructed data block to the mirrored subsystem.

9. A method as in claim 8, wherein the redundancy group is a RAID-5 array.

10. A method as in claim 8, wherein the redundancy group is a RAID-3 array.

11. A method as in claim 8, wherein the redundancy group is a RAID-1/0 array.

12. A method as in claim 8, wherein the redundancy group is a RAID-1 array.

13. A method as in claim 8, wherein the mirrored subsystem is a RAID-1 array.

14. A method as in claim 8, further comprising:
inserting a replacement disk drive in the failed disk drive slot;
copying data from the temporary disk drive to the replacement disk drive; and
replacing the mirrored subsystem with the replacement disk drive after the data on the replacement disk drive matches the data on the temporary disk drive.

* * * * *